(12) United States Patent
Li et al.

(10) Patent No.: US 12,177,898 B2
(45) Date of Patent: Dec. 24, 2024

(54) COMMUNICATION METHOD, DEVICE AND SYSTEM, AND STORAGE MEDIUM

(71) Applicant: BOE Technology Group Co., Ltd., Beijing (CN)

(72) Inventors: Xianzhen Li, Beijing (CN); Yi Bian, Beijing (CN); Enhui Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 428 days.

(21) Appl. No.: 17/483,721

(22) Filed: Sep. 23, 2021

(65) Prior Publication Data

US 2022/0104255 A1 Mar. 31, 2022

(30) Foreign Application Priority Data

Sep. 30, 2020 (CN) .......................... 202011064914.6

(51) Int. Cl.
H04W 74/0808 (2024.01)
(52) U.S. Cl.
CPC .............................. H04W 74/0808 (2013.01)

(58) Field of Classification Search
CPC ........................ G06F 3/1423; H04W 52/0216
USPC ............................................................ 455/450
See application file for complete search history.

(56) References Cited

U.S. PATENT DOCUMENTS

| | | | |
|---|---|---|---|
| 2014/0342745 A1* | 11/2014 | Bhushan | H04L 1/00 455/450 |
| 2018/0302927 A1* | 10/2018 | Noh | H04W 74/0816 |
| 2020/0015093 A1* | 1/2020 | Li | H04W 72/0446 |
| 2021/0259014 A1* | 8/2021 | Falahati | H04W 74/0808 |
| 2022/0295546 A1* | 9/2022 | Kim | H04W 74/085 |
| 2022/0400504 A1* | 12/2022 | Zhu | H04W 72/1273 |

* cited by examiner

*Primary Examiner* — Fabricio R Murillo Garcia
(74) *Attorney, Agent, or Firm* — IPro, PLLC

(57) ABSTRACT

A communication method is provided. The communication method includes: determining an idle channel by a communication device; executing a first step on the idle channel, wherein the first step includes sequentially transmitting a first channel occupancy signal and monitoring a signal monitoring on the idle channel; repeating the first step for a preset number of times; and communicating on the idle channel in response to no signal being monitored during repetition of the first step.

15 Claims, 4 Drawing Sheets

US 12,177,898 B2

COMMUNICATION METHOD, DEVICE AND SYSTEM, AND STORAGE MEDIUM

CROSS-REFERENCE TO RELATED APPLICATION

This application claims priority to Chinese Patent Application No. 202011064914.6, filed on Sep. 30, 2020 and entitled "COMMUNICATION METHOD, DEVICE AND SYSTEM, AND STORAGE MEDIUM", the disclosure of which is herein incorporated by reference in its entirety.

TECHNICAL FIELD

The present disclosure relates to the field of communication technologies, and in particular relates to a communication method, device and system and a storage medium.

BACKGROUND

One-to-many or many-to-one communication usually occurs in wireless communication. Generally, ifs required that other communication devices do not transmit signals simultaneously when one communication device transmits a signal, so as to avoid channel congestion which may results in communication failure. In order to avoid the foregoing problem, it is necessary to know whether a channel is idle prior to signal transmission.

In the related art, an idle channel evaluation mode is to estimate signal energy of the channel, and it is believed that the channel is idle if the signal energy is lower than a certain threshold.

SUMMARY

The present disclosure provides a communication method, device and system and a storage medium.

In a first aspect of the present disclosure, a communication method is provided and applicable to a communication device. The communication method includes: determining an idle channel by the communication device; executing a first step on the idle channel; wherein the first step includes sequentially transmitting a first channel occupancy signal and monitoring a signal on the idle channel; repeating the first step for a preset number of times; and communicating on the idle channel in response to no signal being monitored during repetition of the first step.

Optionally, a duration of the first channel occupancy signal is not less than a first duration threshold, the first duration threshold is not less than a sum of a second duration threshold and a third duration threshold, the second duration threshold is a frame interval threshold, and the third duration threshold is an interval threshold between a transmission frame and a response frame of the transmission frame.

Optionally, the duration of the first channel occupancy signal is generated randomly within a value range not less than the first duration threshold.

Optionally, a duration of monitoring the signal on the idle channel is generated randomly within a value range not less than the first duration threshold.

Optionally, the communication method further includes: re-executing the first step after being dormant for a preset time interval, in response to the signal being monitored during repetition of the first step.

Optionally, the communication method further includes: re-counting a number of times of repeating the first step in response to the signal being monitored during the repetition of the first step.

Optionally, determining the idle channel by the communication device includes: monitoring a signal on a target channel; and determining the target channel as the idle channel in response to a monitoring duration on the target channel exceeding the first duration threshold and no signal being monitored.

Optionally, the communication method further includes: re-monitoring the signal on the target channel after being dormant for a preset time interval, in response to the signal being monitored when the monitoring duration on the target channel does not exceed the first duration threshold.

Optionally, the preset number of times is determined based on a preset tolerable channel conflict probability.

In a second aspect of the present disclosure, a communication device is provided. The communication device includes: a communication unit, configured to transceive a communication message on a channel; a memory, configured to store at least one set of instructions; and at least one processor, configured to execute the at least one set of instructions to perform the method as defined in the first aspect.

In third aspect of the present disclosure, a communication system is provided. The communication system includes: at least two communication devices, wherein each of the at least two communication devices is configured to communicate by the method as defined in the first aspect.

In a fourth aspect of the present disclosure, a communication system is provided. The communication system includes: at least two communication devices and a server; wherein each of the at least two communication devices is configured to: determine an idle channel; and execute a first step on the idle channel, wherein the first step comprises sequentially transmitting a first channel occupancy signal and monitoring a signal on the idle channel; and the server is configured to: determine the communication device that transmits the first channel occupancy signal on the idle channel; compare durations of the first channel occupancy signals transmitted by the communication devices; allocate the idle channel to the communication device that transmits the first channel occupancy signal with a longest duration; and transmit an allocation result to the communication devices that transmit the first channel occupancy signals.

In a fifth aspect of the present disclosure, a non-transitory computer-readable storage medium storing a computer instruction is provided. The computer instructions, when executed by a computer, cause the computer to perform the method as defined in the first aspect.

BRIEF DESCRIPTION OF THE DRAWINGS

FIG. t is an exemplary schematic structural diagram of a communication system according to an embodiment of the present disclosure.

DETAILED DESCRIPTION

To make the objectives, technical solutions and advantages of the present disclosure clearer, the present disclosure will be described below in detail in combination with the embodiments and with reference to the accompanying drawings.

It should be noted that unless otherwise defined, technical terms or scientific terms used in the present disclosure shall be of ordinary meaning as understood by those of ordinary skill in the art to which the present disclosure pertains. The term "first" or "second" or a similar term used in the present disclosure does not denote any order, quantity, or importance, but is merely used to distinguish different components. The term "comprising" or "including" or a similar term means that elements or items preceding the term include the elements or items listed after the term and their equivalents, and do not exclude other elements or items. The term "connection" or "connected to" or a similar term is not limited to a physical or mechanical connection but may include an electrical connection that is direct or indirect.

In the related art, there are some problems in determining whether a channel is in an idle state by estimating signal energy of the channel. If two communication devices simultaneously detect the channel energy when the channel is in an idle state, both of the two communication devices will determine that the channel is in an idle state, and thus will communicate on the channel simultaneously. That is, although the communication devices determine whether the channel is idle prior to transmission, the problems of mutual interference and conflicts are still aroused.

Figure 1:
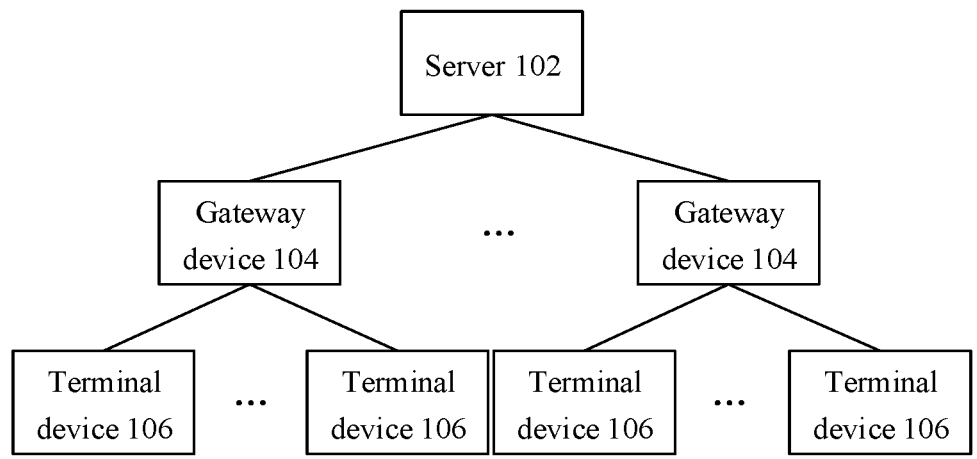

FIG. 1 is an exemplary schematic structural diagram of a communication system according to the present disclosure. As shown in FIG. 1, the communication system 100 includes at least two communication devices, and the communication device may be, for example, a server 102, a gateway device 104 or a terminal device 106. The server 102, the gateway device 104 and the terminal device 106 may communicate with one another by means of wireless communication. As shown in FIG. 1, the terminal device 106 is in communication connection with the server 102 by the gateway device 104.

During the process of wireless communication, the length of each frame of the communication device (e.g., the server 102, the gateway device 104 or the terminal device 106) is variable, and generally, a frame interval threshold is not greater than T1 (a second duration threshold). The frame interval threshold is generally determined by hardware properties of the device per se (for example, determined by hardware characteristics of an RF chip), and is generally invariable. During each communication, an interval threshold between a transmission frame and a response frame responding to the transmission frame is not greater than T2 (a third duration threshold), and is generally determined by hardware properties of the device per se (for example, determined by the hardware characteristics of the RF chip). Generally, the interval threshold is invariable.

Figure 3:
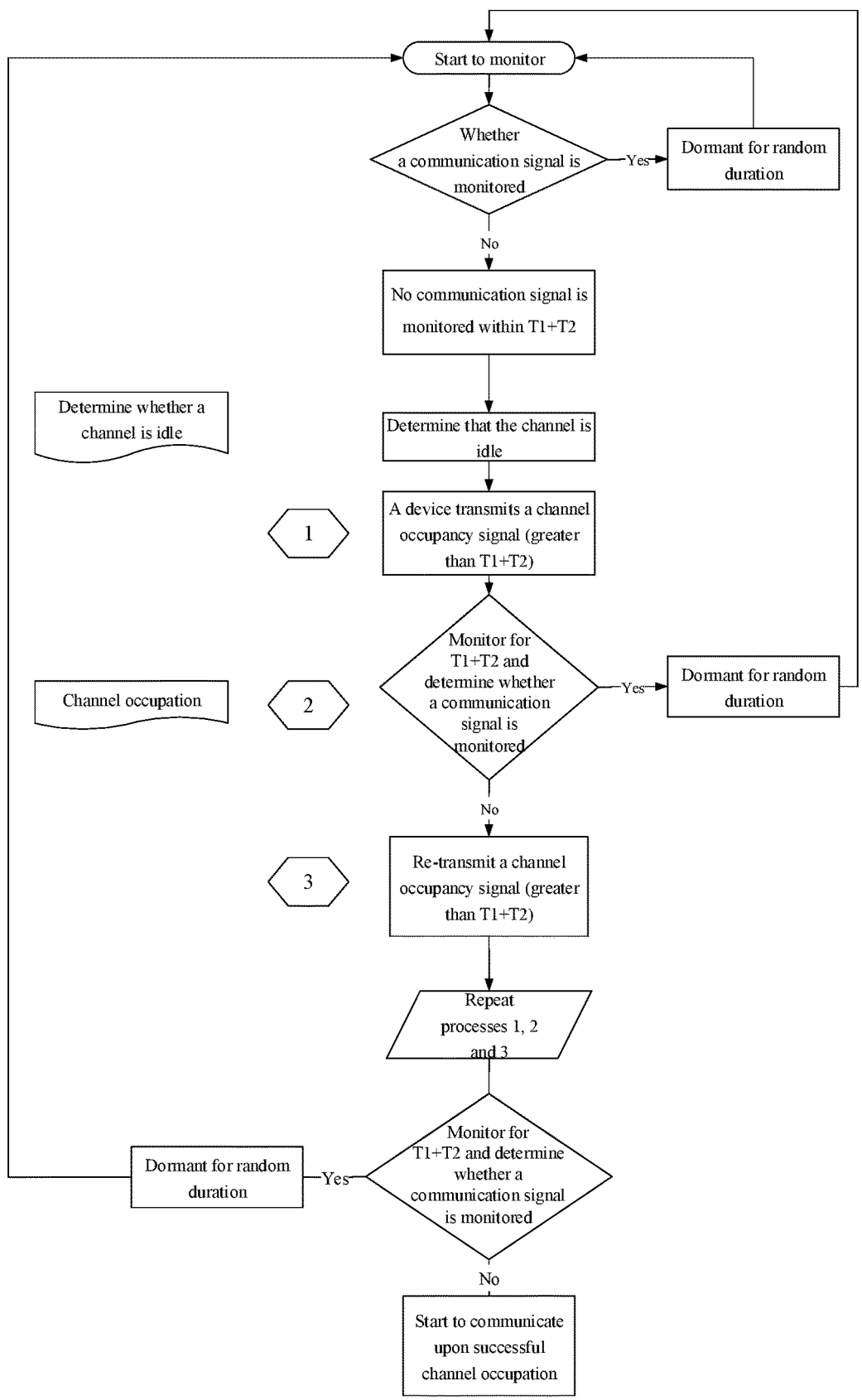
FIG. 3 is another exemplary schematic flowchart of a communication method according to an embodiment of the present disclosure.

As shown in FIG. 3, a communication method 200 of the communication device mainly includes two phases: a phase of determining whether a channel is idle or not, and a phase of occupying the channel in response to determining that the channel is idle.

Figure 2:
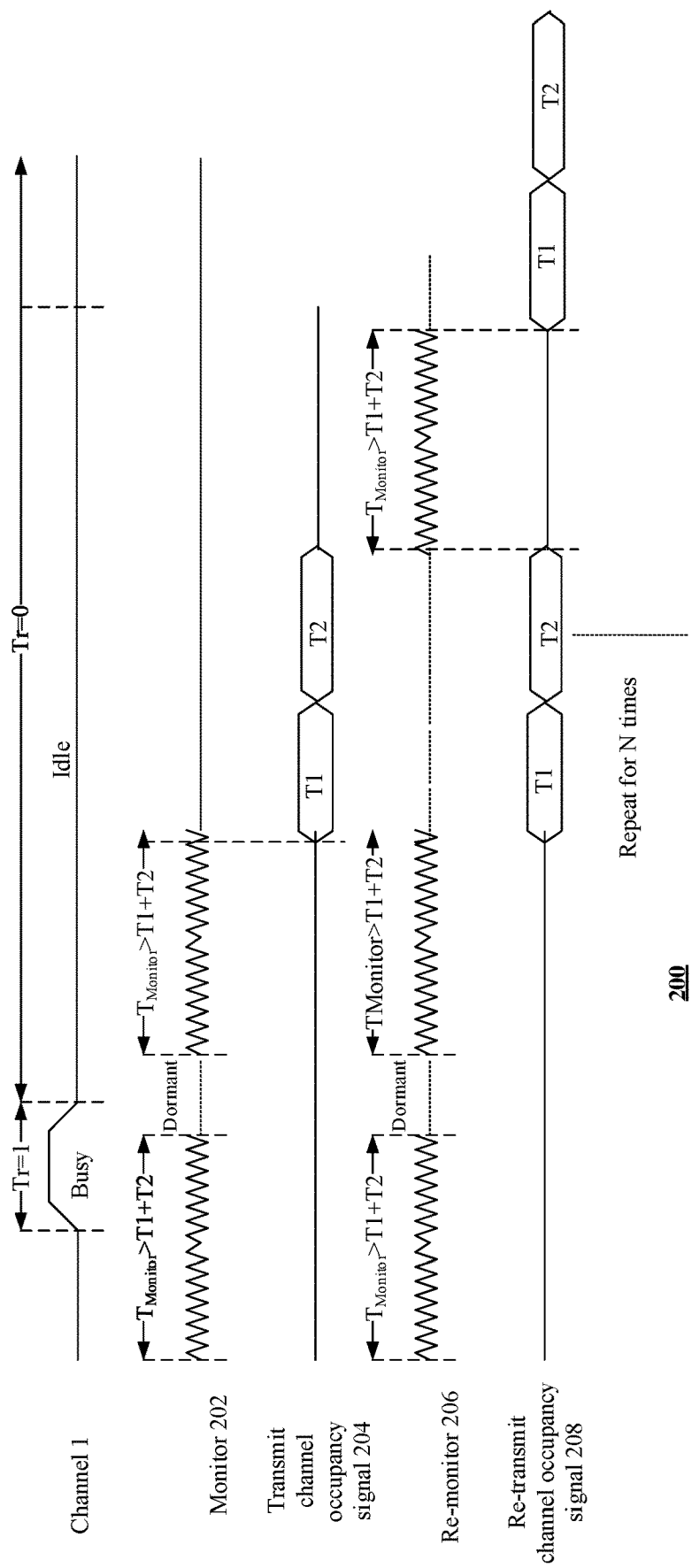
FIG. 2 is an exemplary schematic flowchart of a communication method according to an embodiment of the present disclosure.

As shown in FIG. 2 and FIG. 3, in step 202, prior to initiation of each communication, the device initiating the communication (e.g., the server 102, the gateway device 104 or the terminal device 106) needs to monitor a selected channel 1 for at least T1+T2 (a first duration threshold). In response to a signal being monitored in the channel 1, it is determined that the channel 1 is occupied, that is, the channel 1 in FIG. 2 is in a busy state, and the device initiating the communication is re-monitors the channel 1 after being dormant for a random duration, until no signal is monitored within T1+T2. At this time, it is determined that the channel 1 is idle.

T2 is not less than the interval threshold between the transmission frame and the response frame, and the interval threshold between the transmission frame and the response frame is a duration from completion of transmission of the transmission frame to reception of the response frame. T1 is not less than an inter-frame interval, and the inter-frame interval is a duration from reception of the response frame to start of transmission of the next transmission frame. Therefore, T1+T2 is not less than a time interval between two transmission frames.

As shown in FIG. 2 and FIG. 3, in step 204, the device initiating communication transmits a channel occupancy signal with a time span greater than or equal to T1+T2 on the channel 1 in response to detecting that the channel 1 is idle. It should be noted that in some embodiments, the monitored signal may include a normal communication signal between devices, and may also include the channel occupancy signal. It is determined that there is a signal on the channel as long as the signal has been monitored on the channel.

In the embodiment of the present disclosure, the channel occupancy signal may be a signal with no practical significance, is only configured to occupy the channel, and does not require a reception feedback from a receiving end. Certainly, in other embodiments, the channel occupancy signal may also be a signal to be transmitted, but as a channel occupancy signal, it still does not require a reception feedback from the receiving end. That is, it is unnecessary to guarantee the transmission accuracy.

As shown in FIG. 2 and FIG. 3, in step 206, monitoring is conducted for T1+T2 on the channel 1. In some embodiments, the duration of monitoring on the channel 1 is greater than T1+T2. In step 208, the channel occupancy signal is re-transmitted in response to no signal being monitored.

In an exemplary embodiment, for the same communication device, both the duration of monitoring on the channel 1 and the duration of the channel occupancy signal are randomly acquired, and the two durations may be the same or different. In another implementation, only one of the duration of monitoring on the channel 1 and the duration of the channel occupancy signal may be acquired randomly, and the other one is a fixed duration.

In an exemplary embodiment, the duration of the channel occupancy signal is generated randomly within a value range not less than the first duration threshold.

In an exemplary embodiment, the duration of signal monitoring on the channel 1 is generated randomly within the value range not less than the first duration threshold.

By generating the duration of monitoring on the channel 1 and the duration of the channel occupancy signal randomly, the duration of monitoring and the duration of the channel occupancy signal for different communication devices may be different, to avoid conflicts and interference between different communication devices.

Generally, for multiple communication devices, each communication device may monitor on the channel 1 for a random duration and transmit a channel occupancy signal with a random duration. The communication device with the shortest randomly acquired duration of monitoring and the longest duration of the channel occupancy signal may acquire the right to use the channel most easily.

Step 206 and step 208 are repeated for N times in total, which is called a channel occupation process.

In a possible implementation, for one communication device, the communication device monitors on the channel 1 for a random duration and transmits a channel occupancy signal with a random duration only prior to transmitting the channel occupancy signal and monitoring on the channel for the first time. In this way, the communication device with the shortest randomly acquired duration of monitoring and the longest duration of the channel occupancy signal may acquire the right to use the channel as soon as possible, thus guaranteeing the use efficiency of the channel.

In other possible implementations, for one communication device, the communication device may monitor on the channel 1 for a random duration and transmit a channel occupancy signal with a random duration prior to each transmission of the channel occupancy signal and each time of monitoring on the channel.

In some embodiments, the number N of repetition of step 206 and step 208 may be determined based on a preset tolerable channel conflict probability. The greater N is, the lower the tolerance to a channel conflict is, and the smaller N is, the higher the tolerance to a channel conflict is.

The channel occupation is stopped immediately in response to a signal being monitored during the channel occupation, and monitoring on the idle channel is re-conducted after random delay.

Communication is started in response to no signal being monitored during the channel occupation.

According to the communication method provided in the present disclosure, by monitoring on the idle channel, pre-emption of the channel and interference with other communications when other communications are in progress can be avoided. In addition, through the channel preemption process, the channel is prevented from being occupied by other devices after N cycles of monitoring on the channel; and other devices can monitor the channel occupancy signal after N cycles of transmitting the channel occupancy signal, such that the channel has a lower possibility of being occupied by multiple devices simultaneously so as to reduce the probability that multiple devices detect the idle channel simultaneously and start to communicate simultaneously.

Optionally, the duration of the channel occupancy signal is not less than T1+T2, such that the channel occupancy signal can be monitored by other devices as far as possible, and hence other devices will not occupy the channel. Thus, the success rate of channel occupation by the device is improved, and the probability of conflict is reduced.

In an actual test, two transmitters transmit data simultaneously at the same frequency and rate. If the communication method provided in the present disclosure is not adopted for determination and preemption of the idle channel, packet errors may occur from time to time, which indicates a data error caused by a conflict of multiple signals in air. With the communication method provided in the present disclosure, it can be found through observation that one module is transmitting while the other module actively evades, such that the transmission is delayed, and there is no obvious packet error at the receiving end.

In some embodiments of the present disclosure, the right to use the channel is determined by the communication device per se, that is, step 206 and step 208 are repeated for N times in total, and if no signal has been monitored during the N times of repetitions, it's determined that the communication device acquires the right to use and can communicate on the idle channel.

In other embodiments of the present disclosure, allocation of the right to use the channel may be implemented by the server, and the terminal device 106 is configured to determine the idle channel; and execute a first step on the idle channel. The first step includes transmitting a first channel occupancy signal on the idle channel and monitoring a signal on the idle channel. The duration of the first channel occupancy signal is not less than a first duration threshold, and the first duration threshold is not less than a sum of a second duration threshold and a third duration threshold. The second duration threshold is a frame interval threshold, and the third duration threshold is an interval threshold between a transmission frame and a response frame of the transmission frame.

The server 102 is configured to: monitor the idle channel and determine a communication device that transmits the first channel occupancy signal on the idle channel; compare durations of the first channel occupancy signals transmitted by the communication devices; allocate the idle channel to the communication device that transmits the first channel occupancy signal with the longest duration, and transmit an allocation result to the communication devices that transmit the first channel occupancy signals.

In this embodiment, the server 102 monitors the idle channel. The server 102 allocates the idle channel to the communication device that transmits the first channel occupancy signal with the longest duration, in response to discovering that multiple devices compete for the idle channel simultaneously, and transmits the allocation result to all the devices competing for the same channel simultaneously, so as to prevent a communication conflict or interference, which can speed up determination of the right to use the channel and improve the use efficiency of the channel.

Figure 4:
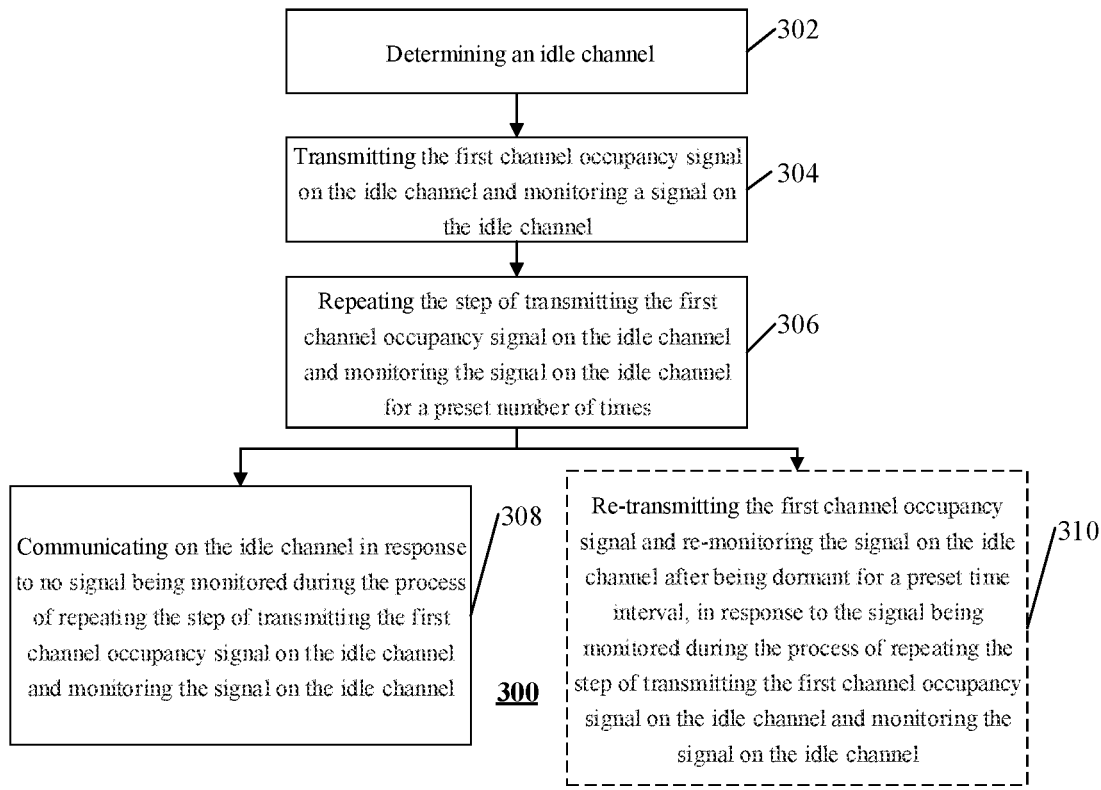
FIG. 4 is yet another exemplary schematic flowchart of a communication method according to an embodiment of the present disclosure.

FIG. 4 is yet another exemplary schematic flowchart of a communication method according to an embodiment of the present disclosure.

As shown in FIG. 4, the communication method 300 is applicable to a communication device and includes the following steps.

In step 302, the communication device determines an idle channel.

In some embodiments, determining the idle channel includes: monitoring a signal on a target channel; and determining the target channel as the idle channel in response to a monitoring duration in the target channel exceeding a first duration threshold and no signal being monitored.

Optionally, determining the idle channel further includes: determining a target channel. Signal monitoring is performed on the target channel after the target channel is determined.

In some embodiments, the communication method further includes: re-monitoring the signal on the target channel after being dormant for a preset time interval, in response to no signal being monitored within a monitoring duration on the target channel which does not exceed the first duration threshold.

It should be noted that there may be ways for determining the idle channel in this step. It can be known that the idle channel may also be determined in other ways.

In step 304, the first channel occupancy signal is transmitted on the idle channel and a signal is monitored on the idle channel.

The duration of the first channel occupancy signal is greater than or equal to the first duration threshold (e.g., T1+T2 shown in FIG. 2), and the first duration threshold is greater than or equal to the sum of the second duration threshold (e.g., T1 shown in FIG. 2) and the third duration threshold (e.g., T2 shown in FIG. 2). The second duration threshold is the frame interval threshold between the transmission frames, and the third duration threshold is the interval threshold between the transmission frame and the response frame of the transmission frame.

In this step, in order to avoid the situation that no signal is monitored due to a frame interval or an interval between the transmission frame and its response frame, the duration of the first channel occupancy signal needs to be greater than the first duration threshold (its value is greater than or equal to the sum of the frame interval threshold and the interval threshold between the transmission frame and the corresponding response frame), so as to ensure that the first channel occupancy signal can be monitored by other devices during the channel occupation process, and also ensure that signals from other devices can be monitored when monitoring is performed during the channel occupation process.

In an exemplary embodiment, for the same communication device, the duration of monitoring on the idle channel and the duration of the first channel occupation signal are both randomly acquired, and may be the same or different.

In an exemplary embodiment, the duration of the first channel occupancy signal is generated randomly within a value range not less than the first duration threshold.

In an exemplary embodiment, the duration of signal monitoring on the idle channel is generated randomly within the value range not less than the first duration threshold.

By generating the duration of monitoring on the idle channel and the duration of the first channel occupancy signal randomly, the duration of monitoring and the duration of the first channel occupancy signal may be different for different communication devices, to avoid conflicts and interference between different communication devices.

Generally, for multiple communication devices, each communication device may monitor on the channel 1 for a random duration and transmit a channel occupancy signal with a random duration. The communication device with the shortest randomly acquired duration of monitoring and the longest duration of the channel occupancy signal may acquire the right to use the channel most easily.

In step 306, the step of transmitting the first channel occupancy signal on the idle channel and monitoring the signal on the idle channel is repeated for a preset number of times.

Optionally, the preset number of times is determined based on a preset tolerable channel conflict probability. The greater N is, the lower the tolerance to a channel conflict is, and the smaller N is, the higher the tolerance to a channel conflict is.

In a possible implementation, for one communication device, the communication device monitors on the channel 1 for a random duration and transmits a channel occupancy signal with a random duration only prior to transmitting the channel occupancy signal and monitoring on the channel for the first time. In this way, the communication device with the shortest randomly acquired duration of monitoring and the longest duration of the channel occupancy signal may acquire the right to use the channel as soon as possible, thus guaranteeing the use efficiency of the channel.

In other possible implementations, for one communication device, the communication device may monitor on the channel 1 for a random duration and transmit a channel occupancy signal with a random duration prior to each transmission of the channel occupancy signal and each time of monitoring on the channel.

In step 308, communication is performed on the idle channel in response to no signal being monitored during the process of repeating the step of transmitting the first channel occupancy signal on the idle channel and monitoring the signal on the idle channel.

Optionally, the communication method 300 further includes step 310. In step 310, the first channel occupancy signal is re-transmitted and the signal is re-monitored on the idle channel after being dormant for a preset time interval, in response to the signal being monitored during the process of repeating the step of transmitting the first channel occupancy signal on the idle channel and monitoring the signal on the idle channel.

Optionally, the communication method 300 further includes: re-counting the number of repetitions of the steps of transmitting the first signal occupation signal on the idle channel and monitoring the signal on the idle channel in response to signals being monitored during the process of repeating the steps of transmitting the first channel occupancy signal on the idle channel and monitoring the signal on the idle channel.

It can be seen from the above embodiments that according to the communication method provided in the present disclosure, preempting the channel and interfering with other communications when other communications are in progress can be avoided by monitoring on the idle channel. In addition, through the channel preemption process, the situation that multiple devices detect the idle channel simultaneously and simultaneously start to communicate may be avoided. Moreover, according to the communication methods provided in the embodiments of the present disclosure, a channel is first monitored for a time period of T1+T2 prior to transmission of the signal to determine whether the channel is idle; and the channel occupancy process is started in response to the channel being idle, so that the idle channel is determined more conveniently without occupying too many resources.

It should be noted that the method according to the present disclosure may be executed by a single device, such as a computer or a server. The method according to the present disclosure is also applicable to a distributed scenario, in which the method is accomplished by the mutual coordination of a plurality of devices. In the case of such a distributed scenario, one of the plurality of devices may only execute one or more steps of the method, and the plurality of devices interact with each other to accomplish the described method.

The present disclosure further provides a communication device. The communication device includes a communication unit, configured to receive and transmit communication messages on a channel; a memory configured to store a set of instructions; and at least one processor, configured to execute the set of instructions to perform any embodiment or an arrangement or a combination of the embodiments of the communication method.

Figure 5:
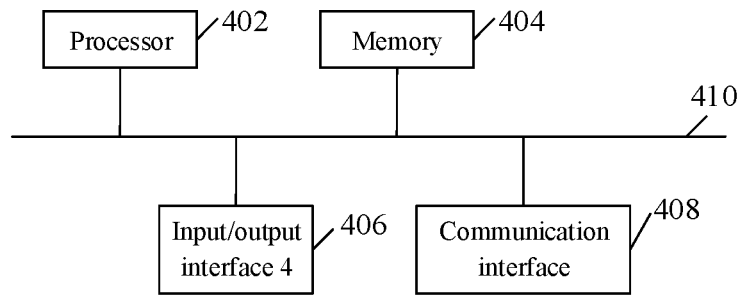
FIG. 5 is a schematic diagram of a hardware structure of a communication device according to an embodiment of the present disclosure.

FIG. 5 is a schematic diagram of a hardware structure of a communication device according to an embodiment of the present disclosure. The communication device may include a processor 402, a memory 404, an input/output interface 406, a communication interface 408, and a bus 410. The processor 402, the memory 404, the input/output interface 406, and the communication interface 408 are in communication connection with one another in the communication device by the bus 410.

The processor 402 may be implemented by means of a general central processing unit (CPU), a microprocessor, an application specific integrated circuit (ASIC), or one or more integrated circuits, to execute related programs so as to implement the technical solutions provided by the embodiments of the present disclosure.

The memory 404 may be implemented in the form of a read-only memory (ROM), a random access memory (RAM), a static storage device, a dynamic storage device, etc. The memory 404 may store an operating system and other application programs. When the technical solutions provided by the embodiments of the present disclosure are implemented by software or firmware, relevant program codes are stored in the memory 404 and called for execution by the processor 402.

The input/output interface 406 is configured to be connected to an input/output module, to input and output information. The input/output module may be configured in a device (not shown in the figure) as a component, or externally connected to a device to provide corresponding functions. The input module may include a keyboard, a mouse, a touch screen, a microphone, various sensors, and the like, and the output module may include a display, a speaker, a vibrator, an indicator light, and the like.

The communication interface 408 is configured to be connected with a communication module (not shown in the figure), to implement communication interaction between the communication device and other devices. The communication module may realize communication in a wired manner a USB and a network cable), or a wireless manner (e.g., a mobile network, WIFI and Bluetooth).

The bus 410 includes a path by which information is transmitted among the various components of the communication device (e.g., the processor 402, the memory 404, the input/output interface 406, and the communication interface 408).

It should be noted that although only the processor 402, the memory 404, the input/output interface 406, the communication interface 408, and the bus 410 in the communication device are showed, in practice, the device may further include other components required for normal operation. In addition, those skilled in the art can understand that the above-mentioned device may only include the components required for implementing the solutions of the embodiments of the present disclosure, rather than all the components shown in the figure.

It should be noted that the some embodiments of the present disclosure are described above. Other embodiments shall fall within the scope of the appended claims. In some cases, the operations and steps recorded in the claims may be executed in an order different from that in the embodiments, and the desired result can still be achibed. In addition, the processes depicted in the accompanying drawings are not necessarily performed based on the illustrated specific order or continuous order to achieve the desired result. In some embodiments, multi-task processing and parallel processing are also possible or may be advantageous.

Persons of ordinary skill in the art should understand that the discussion of raw of the above embodiments is merely for an exemplary purpose, and is not intended to imply that the scope of the present disclosure (including the claims) is limited to these examples. Under the concept of the present disclosure, the above embodiments or the technical features in different embodiments may also be combined, and the steps may be accomplished in any order. Moreover, many other variations in different aspects of the present disclosure as described above are possible but not provided in the detail for the sake of brevity.

In addition, for the brevity of description and discussion and in order not to make the present disclosure difficult to understand, the collection between the well-known power/ground in other components and the integrated circuit (IC) chips may or may not be illustrated in the provided drawings. In addition, the device may be illustrated in the form of block diagrams in order not to make the present disclosure difficult to understand and in consideration of the fact that the details about the embodiments of the device in these block diagrams are highly dependent on the platform on which the present disclosure will be implemented (that is, these details should be fully within the understanding of those skilled in the art). In the case where the specific details (for example, the circuits) are set forth to describe the exemplary embodiments of the present disclosure, it is obvious to those skilled in the art that the present disclosure may be implemented without these specific details or with changes to these specific details. Therefore, these descriptions should be considered illustrative rather than restrictive.

Although the present disclosure has been described in combination with the embodiments, many substitutions, modifications and variations of these embodiments will be apparent to those of ordinary skill in the art based on the foregoing description.

The present disclosure is intended to cover all such substitutions, modifications and variations that fall within the broad scope of the appended claims. Therefore, any omissions, modifications, equivalent substitutions, improvements, etc. made within the spirit and principles of the present disclosure should be included in the protection scope of the present disclosure.

What is claimed is:

1. A communication method, applicable to a communication device, comprising:
    determining an idle channel;
    executing a first step on the idle channel, wherein the first step comprises sequentially transmitting a first channel occupancy signal and monitoring on the idle channel, wherein a duration of the first channel occupancy signal is not less than a first duration threshold, the first duration threshold is not less than a sum of a second duration threshold and a third duration threshold, the second duration threshold is a frame interval threshold, and the third duration threshold is an interval threshold between a transmission frame and a response frame of the transmission frame;
    repeating the first step for a preset number of times; and
    communicating on the idle channel in response to no signal being monitored in a process of repeating the first step for the preset number of times.

2. The communication method according to claim 1, wherein the duration of the first channel occupancy signal is generated randomly within a value range not less than the first duration threshold.

3. The communication method according to claim 1, wherein a duration of the monitoring on the idle channel is generated randomly within a value range not less than the first duration threshold.

4. The communication method according to claim 1, further comprising:
    re-executing the first step and re-counting a number of times of repeating the first step after being dormant for a preset time interval, in response to a signal being monitored in the process of repeating the first step for the preset number of times.

5. The communication method according to claim 1, wherein the determining the idle channel comprises:
    monitoring on a target channel; and
    determining the target channel as the idle channel in response to a monitoring duration on the target channel exceeding the first duration threshold and the no signal being monitored.

6. The communication method according to claim 5, further comprising:

re-monitoring on the target channel after being dormant for a preset time interval, in response to a signal being monitored when the monitoring duration on the target channel does not exceed the first duration threshold.

7. The communication method according to claim 1, wherein the preset number of times is determined based on a preset tolerable channel conflict probability.

8. A communication device, comprising:
a memory, configured to store at least one set of instructions; and
at least one processor, configured to execute the at least one set of instructions to:
determine an idle channel;
execute a first step on the idle channel, wherein the first step comprises sequentially transmitting a first channel occupancy signal and monitoring on the idle channel, wherein a duration of the first channel occupancy signal is not less than a first duration threshold, the first duration threshold is not less than a sum of a second duration threshold and a third duration threshold, the second duration threshold is a frame interval threshold, and the third duration threshold is an interval threshold between a transmission frame and a response frame of the transmission frame;
repeat the first step for a preset number of times; and
communicate on the idle channel in response to no signal being monitored in a process of repeating the first step for the preset number of times.

9. The communication device according to claim 8, wherein the duration of the first channel occupancy signal is generated randomly within a value range not less than the first duration threshold.

10. The communication device according to claim 8, wherein a duration of the monitoring on the idle channel is generated randomly within a value range not less than the first duration threshold.

11. The communication device according to claim 8, wherein the at least one processor is configured to execute the at least one set of instructions to:
re-execute the first step and re-counting a number of times of repeating the first step after being dormant for a preset time interval, in response to a signal being monitored in the process of repeating the first step for the preset number of times.

12. The communication device according to claim 8, wherein the at least one processor is configured to execute the at least one set of instructions to:
monitor on a target channel; and determining the target channel as the idle channel in response to a monitoring duration on the target channel exceeding the first duration threshold and the no signal being monitored.

13. The communication device according to claim 12, wherein the at least one processor is configured to execute the at least one set of instructions to:
re-monitor on the target channel after being dormant for a preset time interval, in response to a signal being monitored when the monitoring duration on the target channel does not exceed the first duration threshold.

14. The communication device according to claim 8, wherein the preset number of times is determined based on a preset tolerable channel conflict probability.

15. A communication system, comprising: at least two communication devices and a server, wherein:
each of the at least two communication devices is configured to: determine an idle channel; and execute a first step on the idle channel, wherein the first step comprises sequentially transmitting a first channel occupancy signal and monitoring on the idle channel, wherein a duration of the first channel occupancy signal is not less than a first duration threshold, the first duration threshold is not less than a sum of a second duration threshold and a third duration threshold, the second duration threshold is a frame interval threshold, and the third duration threshold is an interval threshold between a transmission frame and a response frame of the transmission frame; and
the server is configured to: determine communication devices, from the at least two communication devices, that transmit first channel occupancy signals on the idle channel; compare durations of the first channel occupancy signals transmitted by the communication devices; allocate the idle channel to a communication device that transmits a first channel occupancy signal with a longest duration; and transmit an allocation result to the communication devices that transmit the first channel occupancy signals.

\* \* \* \* \*